United States Patent
Ratcliff

(10) Patent No.: US 8,285,791 B2
(45) Date of Patent: Oct. 9, 2012

(54) METHOD AND APPARATUS FOR SHARING INFORMATION USING A HANDHELD DEVICE

(75) Inventor: Raymond F. Ratcliff, Austin, TX (US)

(73) Assignee: Wireless Recognition Technologies LLC, Frisco, TX (US)

( * ) Notice: Subject to any disclaimer, the term of this patent is extended or adjusted under 35 U.S.C. 154(b) by 0 days.

(21) Appl. No.: 12/604,982

(22) Filed: Oct. 23, 2009

(65) Prior Publication Data

US 2010/0039533 A1 Feb. 18, 2010

Related U.S. Application Data

(63) Continuation of application No. 11/780,895, filed on Jul. 20, 2007, now Pat. No. 7,856,474, which is a continuation of application No. 09/818,003, filed on Mar. 27, 2001, now Pat. No. 7,392,287.

(51) Int. Cl.
*G06F 15/16* (2006.01)

(52) U.S. Cl. ........ 709/205; 709/217; 370/389; 250/236; 707/E17.008

(58) Field of Classification Search .......... 709/205, 709/217; 370/389; 250/236; 707/E17.008
See application file for complete search history.

(56) References Cited

U.S. PATENT DOCUMENTS

| | | | |
|---|---|---|---|
| 1,915,993 A | 6/1933 | Handel | |
| 3,585,588 A | 6/1971 | Hardin et al. | |
| 3,585,592 A | 6/1971 | Kiji et al. | |
| 3,613,080 A | 10/1971 | Angeloni, Sr. et al. | |
| 3,634,823 A | 1/1972 | Dietrich et al. | |
| 3,644,890 A | 2/1972 | Matthews et al. | |
| 3,701,095 A | 10/1972 | Yamaguchi et al. | |
| 3,706,851 A | 12/1972 | Froehlich et al. | |
| 3,710,319 A | 1/1973 | Miller et al. | |
| 3,723,970 A | 3/1973 | Stoller | |
| 3,744,025 A | 7/1973 | Bilgutay | |

(Continued)

FOREIGN PATENT DOCUMENTS

EP 0665504 8/1995

(Continued)

OTHER PUBLICATIONS

Shin, Kyung H.—Office Action dated Aug. 22, 2008; U.S. Appl. No. 11/780,895.

(Continued)

*Primary Examiner* — Kyung H Shin
(74) *Attorney, Agent, or Firm* — Yudell Isidore Ng Russell PLLC

(57) ABSTRACT

A method and apparatus for sending information to a data processing apparatus for identifying a document to share with a recipient. A handheld device is capable of communicating with the data processing apparatus. Information is captured from the document and stored in the handheld device as document data. A communications path is established between the handheld device and the data processing apparatus. The document data is sent to the data processing apparatus through the communications path. Reference documents are provided. Each reference document has reference data stored in a memory. At least a portion of the received document data is extracted as scanning data. The reference data is retrieved from the memory. The scanning data is compared with the reference data. When the scanning data matches at least a portion of the reference data of one of the reference documents, the one reference document is selected as the identified document for forwarding to the recipient.

52 Claims, 3 Drawing Sheets

U.S. PATENT DOCUMENTS

| | | | |
|---|---|---|---|
| 3,755,780 A | 8/1973 | Sammon et al. | |
| 3,761,876 A | 9/1973 | Flaherty et al. | |
| 3,767,847 A | 10/1973 | Haskell et al. | |
| 3,832,683 A | 8/1974 | Nadler et al. | |
| 3,845,466 A | 10/1974 | Hong | |
| 3,868,635 A | 2/1975 | Shah et al. | |
| 3,873,972 A | 3/1975 | Levine | |
| 3,898,617 A | 8/1975 | Kashioka et al. | |
| 3,899,771 A | 8/1975 | Saraga et al. | |
| 3,899,848 A | 8/1975 | Bunin | |
| 3,909,785 A | 9/1975 | Howells | |
| 3,964,022 A | 6/1976 | Martin | |
| 4,017,721 A | 4/1977 | Michaud | |
| 4,060,713 A | 11/1977 | Golay | |
| 4,075,604 A | 2/1978 | Degasperi | |
| 4,075,605 A | 2/1978 | Hilley et al. | |
| 4,075,658 A | 2/1978 | De Cosnac et al. | |
| 4,104,616 A | 8/1978 | Isshiki | |
| 4,105,925 A | 8/1978 | Rossol et al. | |
| 4,148,105 A | 4/1979 | Napolitano | |
| 4,164,924 A | 8/1979 | Makino | |
| 4,180,799 A | 12/1979 | Smith | |
| 4,200,890 A | 4/1980 | Inaba et al. | |
| 4,220,967 A | 9/1980 | Ichida et al. | |
| 4,272,783 A | 6/1981 | Warnstam et al. | |
| 4,284,975 A | 8/1981 | Odaka | |
| 4,288,779 A | 9/1981 | Otsu et al. | |
| 4,295,120 A | 10/1981 | Yoshida | |
| 4,305,130 A | 12/1981 | Kelley et al. | |
| 4,319,266 A | 3/1982 | Bannister et al. | |
| 4,330,833 A | 5/1982 | Pratt et al. | |
| 4,352,125 A | 9/1982 | Guth | |
| 4,364,086 A | 12/1982 | Guth | |
| 4,365,235 A | 12/1982 | Greanias et al. | |
| 4,365,304 A | 12/1982 | Ruhman et al. | |
| 4,390,955 A | 6/1983 | Arimura | |
| 4,402,006 A | 8/1983 | Karlock | |
| 4,409,618 A | 10/1983 | Inaba et al. | |
| 4,472,786 A | 9/1984 | Larson | |
| 4,538,299 A | 8/1985 | Deforest | |
| 4,546,383 A | 10/1985 | Abramatic et al. | |
| 4,606,065 A | 8/1986 | Beg et al. | |
| 4,630,225 A | 12/1986 | Hisano | |
| 4,685,071 A | 8/1987 | Lee | |
| 4,725,824 A | 2/1988 | Yoshioka | |
| 4,731,745 A | 3/1988 | Katagiri et al. | |
| 4,771,474 A | 9/1988 | Takashima et al. | |
| 4,782,388 A | 11/1988 | Lake | |
| 4,783,833 A | 11/1988 | Kawabata et al. | |
| 4,791,675 A | 12/1988 | Deering et al. | |
| 4,805,224 A | 2/1989 | Koezuka et al. | |
| 4,811,408 A | 3/1989 | Goldman | |
| 4,827,413 A | 5/1989 | Baldwin et al. | |
| 4,841,575 A | 6/1989 | Welsh et al. | |
| 4,849,906 A | 7/1989 | Chodos et al. | |
| 4,872,056 A | 10/1989 | Hicks et al. | |
| 4,905,296 A | 2/1990 | Nishihara | |
| 4,918,739 A | 4/1990 | Lorente et al. | |
| 4,975,960 A | 12/1990 | Petajan | |
| 4,975,969 A | 12/1990 | Tal | |
| 4,975,978 A | 12/1990 | Ando et al. | |
| 4,982,176 A | 1/1991 | Schwarz | |
| 4,988,981 A | 1/1991 | Zimmerman et al. | |
| 5,014,327 A | 5/1991 | Potter et al. | |
| 5,034,986 A | 7/1991 | Karmann et al. | |
| 5,054,097 A | 10/1991 | Flinois et al. | |
| 5,060,171 A | 10/1991 | Steir et al. | |
| 5,063,448 A | 11/1991 | Jaffray et al. | |
| 5,077,805 A | 12/1991 | Tan | |
| 5,109,439 A | 4/1992 | Froessl | |
| 5,127,063 A | 6/1992 | Nishiya et al. | |
| 5,136,659 A | 8/1992 | Kaneko et al. | |
| 5,159,647 A | 10/1992 | Burt | |
| 5,168,529 A | 12/1992 | Peregrim et al. | |
| 5,168,531 A | 12/1992 | Sigel | |
| 5,187,574 A | 2/1993 | Kosemura et al. | |
| 5,220,441 A | 6/1993 | Gerstenberger et al. | |
| 5,227,985 A | 7/1993 | Dementhon | |
| 5,233,681 A | 8/1993 | Bahl et al. | |
| 5,251,016 A | 10/1993 | Delwiche | |
| 5,280,530 A | 1/1994 | Trew et al. | |
| 5,313,275 A | 5/1994 | Daly | |
| 5,333,165 A | 7/1994 | Sun | |
| 5,345,313 A | 9/1994 | Blank et al. | |
| 5,383,013 A | 1/1995 | Cox | |
| 5,384,912 A | 1/1995 | Ogrinc et al. | |
| 5,392,447 A | 2/1995 | Schlack et al. | |
| 5,394,517 A | 2/1995 | Kalawsky | |
| 5,398,075 A | 3/1995 | Freytag et al. | |
| 5,416,892 A | 5/1995 | Loken-kim | |
| 5,423,554 A | 6/1995 | Davis | |
| 5,430,809 A | 7/1995 | Tomitaka et al. | |
| 5,432,712 A | 7/1995 | Chan | |
| 5,432,864 A | 7/1995 | Lu et al. | |
| 5,465,353 A | 11/1995 | Hull et al. | |
| 5,469,536 A | 11/1995 | Blank | |
| 5,502,482 A | 3/1996 | Graham | |
| 5,511,153 A | 4/1996 | Azarbayejani et al. | |
| 5,513,129 A | 4/1996 | Bolas et al. | |
| 5,521,373 A | 5/1996 | Lanier et al. | |
| 5,526,022 A | 6/1996 | Donahue et al. | |
| 5,533,177 A | 7/1996 | Wirtz | |
| 5,534,917 A | 7/1996 | Macdougall | |
| 5,546,502 A | 8/1996 | Hart et al. | |
| 5,550,928 A | 8/1996 | Lu et al. | |
| 5,553,217 A | 9/1996 | Hart et al. | |
| 5,563,988 A | 10/1996 | Maes et al. | |
| 5,579,471 A | 11/1996 | Barber et al. | |
| 5,581,625 A | 12/1996 | Connell | |
| 5,588,033 A | 12/1996 | Yeung et al. | |
| 5,615,324 A | 3/1997 | Kuboyama et al. | |
| 5,623,587 A | 4/1997 | Bulman | |
| 5,625,704 A | 4/1997 | Prasad | |
| 5,625,717 A | 4/1997 | Hashimoto et al. | |
| 5,632,002 A | 5/1997 | Hashimoto et al. | |
| 5,655,081 A | 8/1997 | Bonnell et al. | |
| 5,666,159 A | 9/1997 | Parulski | |
| 5,680,487 A | 10/1997 | Markandey | |
| 5,680,548 A | 10/1997 | Trugman | |
| 5,687,306 A | 11/1997 | Blank | |
| 5,692,097 A | 11/1997 | Yamada et al. | |
| 5,699,449 A | 12/1997 | Javidi et al. | |
| 5,706,097 A | 1/1998 | Schelling et al. | |
| 5,714,997 A | 2/1998 | Anderson et al. | |
| 5,715,325 A | 2/1998 | Bang et al. | |
| 5,717,940 A | 2/1998 | Peairs | |
| 5,719,954 A | 2/1998 | Onda | |
| 5,724,579 A | 3/1998 | Suzuki et al. | |
| 5,736,982 A | 4/1998 | Suzuki et al. | |
| 5,740,549 A | 4/1998 | Reilly et al. | |
| 5,752,055 A | 5/1998 | Redpath et al. | |
| 5,761,344 A | 6/1998 | Al-Hussein | |
| 5,764,803 A | 6/1998 | Jacquin et al. | |
| 5,768,633 A | 6/1998 | Allen et al. | |
| 5,774,591 A | 6/1998 | Black et al. | |
| 5,802,220 A | 9/1998 | Black et al. | |
| 5,806,005 A | 9/1998 | Hull et al. | |
| 5,809,171 A | 9/1998 | Neff et al. | |
| 5,815,741 A | 9/1998 | Okuyama | |
| 5,828,769 A | 10/1998 | Burns | |
| 5,832,474 A | 11/1998 | Lopresti et al. | |
| 5,832,530 A | 11/1998 | Paknad et al. | |
| 5,873,077 A | 2/1999 | Kanoh et al. | |
| 5,880,731 A | 3/1999 | Liles | |
| 5,884,247 A | 3/1999 | Christy | |
| 5,892,843 A | 4/1999 | Zhou et al. | |
| 5,897,616 A | 4/1999 | Kanevsky et al. | |
| 5,899,999 A | 5/1999 | De Bonet | |
| 5,905,502 A | 5/1999 | Deering | |
| 5,917,937 A | 6/1999 | Szeliski et al. | |
| 5,923,791 A | 7/1999 | Hanna et al. | |
| 5,926,116 A | 7/1999 | Kitano | |
| 5,956,468 A | 9/1999 | Ancin | |
| 5,968,175 A | 10/1999 | Morishita et al. | |
| 5,978,594 A | 11/1999 | Bonnell et al. | |
| 5,978,829 A | 11/1999 | Chung et al. | |
| 5,982,853 A | 11/1999 | Liebermann et al. | |

| | | |
|---|---|---|
| 5,995,119 A | 11/1999 | Cosatto et al. |
| 5,999,915 A | 12/1999 | Nahan et al. |
| 6,023,241 A | 2/2000 | Clapper |
| 6,032,137 A | 2/2000 | Ballard |
| 6,035,055 A | 3/2000 | Wang et al. |
| 6,041,398 A | 3/2000 | Pechanek et al. |
| 6,044,168 A | 3/2000 | Tuceryan et al. |
| 6,052,123 A | 4/2000 | Lection et al. |
| 6,055,536 A | 4/2000 | Shimakawa et al. |
| 6,104,834 A | 8/2000 | Hull |
| 6,112,225 A | 8/2000 | Kraft et al. |
| 6,121,969 A | 9/2000 | Jain et al. |
| 6,138,129 A | 10/2000 | Combs |
| 6,148,105 A | 11/2000 | Wakisaka et al. |
| 6,167,428 A | 12/2000 | Ellis |
| 6,167,462 A | 12/2000 | Davis et al. |
| 6,181,817 B1 | 1/2001 | Zabih |
| 6,192,157 B1 | 2/2001 | Prebble |
| 6,208,626 B1 | 3/2001 | Brewer |
| 6,208,771 B1 | 3/2001 | Jared et al. |
| 6,219,640 B1 | 4/2001 | Basu et al. |
| 6,222,939 B1 | 4/2001 | Wiskott et al. |
| 6,229,139 B1* | 5/2001 | Neukermans et al. ........ 250/236 |
| 6,233,523 B1 | 5/2001 | Sood |
| 6,253,201 B1 | 6/2001 | Abdel-Mottaleb et al. |
| 6,272,231 B1 | 8/2001 | Maurer et al. |
| 6,301,370 B1 | 10/2001 | Steffens et al. |
| 6,301,386 B1 | 10/2001 | Zhu et al. |
| 6,332,039 B1 | 12/2001 | Bando et al. |
| 6,363,381 B1 | 3/2002 | Lee et al. |
| 6,393,142 B1 | 5/2002 | Swain et al. |
| 6,393,147 B2 | 5/2002 | Danneels et al. |
| 6,397,213 B1 | 5/2002 | Cullen et al. |
| 6,400,374 B2 | 6/2002 | Lanier |
| 6,405,172 B1 | 6/2002 | Baker et al. |
| 6,408,257 B1 | 6/2002 | Harrington et al. |
| 6,411,953 B1 | 6/2002 | Ganapathy et al. |
| 6,448,979 B1 | 9/2002 | Schena et al. |
| 6,457,026 B1 | 9/2002 | Graham et al. |
| 6,466,695 B1 | 10/2002 | Pötzsch et al. |
| 6,470,264 B2 | 10/2002 | Bide |
| 6,504,571 B1 | 1/2003 | Narayanaswami et al. |
| 6,510,509 B1 | 1/2003 | Chopra et al. |
| 6,515,988 B1* | 2/2003 | Eldridge et al. .............. 370/389 |
| 6,537,324 B1 | 3/2003 | Tabata et al. |
| 6,563,950 B1 | 5/2003 | Wiskott et al. |
| 6,574,375 B1 | 6/2003 | Cullen et al. |
| 6,574,644 B2 | 6/2003 | Hsu et al. |
| 6,580,811 B2 | 6/2003 | Maurer et al. |
| 6,611,862 B2 | 8/2003 | Reisman |
| 6,628,412 B1* | 9/2003 | Jeran et al. ................... 358/1.14 |
| 6,707,581 B1* | 3/2004 | Browning ..................... 358/473 |
| 6,725,250 B1 | 4/2004 | Ellis, III |
| 6,732,141 B2 | 5/2004 | Ellis |
| 6,732,915 B1 | 5/2004 | Nelson et al. |
| 6,765,559 B2* | 7/2004 | Hayakawa ..................... 345/173 |
| 6,766,363 B1 | 7/2004 | Rothschild |
| 6,771,568 B2* | 8/2004 | Hochendoner ............ 369/30.06 |
| 6,778,171 B1 | 8/2004 | Kikinis |
| 6,782,144 B2* | 8/2004 | Bellavita et al. .............. 382/310 |
| 6,799,201 B1 | 9/2004 | Lee et al. |
| 6,804,659 B1 | 10/2004 | Graham et al. |
| 6,824,057 B2 | 11/2004 | Rathus et al. |
| 6,827,267 B2 | 12/2004 | Rathus et al. |
| 6,830,187 B2 | 12/2004 | Rathus et al. |
| 6,834,804 B2 | 12/2004 | Rathus et al. |
| 6,843,411 B2 | 1/2005 | Rathus et al. |
| 6,859,909 B1 | 2/2005 | Lerner et al. |
| 6,866,196 B1 | 3/2005 | Rathus et al. |
| 6,920,231 B1 | 7/2005 | Griffin et al. |
| 6,929,182 B2 | 8/2005 | Rathus et al. |
| 6,964,374 B1 | 11/2005 | Djuknic et al. |
| 6,980,962 B1 | 12/2005 | Arganbright et al. |
| 6,983,313 B1 | 1/2006 | Korkea-aho |
| 7,051,086 B2 | 5/2006 | Rhoads et al. |
| 7,172,508 B2 | 2/2007 | Simon et al. |
| 7,185,274 B1 | 2/2007 | Rubin et al. |
| 7,206,820 B2 | 4/2007 | Rhoads et al. |
| 7,343,324 B2* | 3/2008 | Lao et al. ....................... 705/27.1 |
| 7,359,094 B1 | 4/2008 | Sayuda |
| 7,366,979 B2 | 4/2008 | Spielberg et al. |
| 7,392,287 B2* | 6/2008 | Ratcliff, III .................. 709/205 |
| 7,593,952 B2 | 9/2009 | Soll et al. |
| 2001/0011276 A1 | 8/2001 | Durst, Jr. et al. |
| 2001/0024514 A1 | 9/2001 | Matsunaga |
| 2001/0032070 A1 | 10/2001 | Teicher |
| 2001/0039497 A1 | 11/2001 | Hubbard |
| 2001/0042030 A1 | 11/2001 | Ito et al. |
| 2001/0042085 A1 | 11/2001 | Peairs et al. |
| 2001/0043741 A1 | 11/2001 | Mahoney et al. |
| 2001/0049700 A1 | 12/2001 | Ichikura |
| 2002/0013832 A1 | 1/2002 | Hubbard |
| 2002/0019844 A1 | 2/2002 | Kurowski et al. |
| 2002/0073236 A1 | 6/2002 | Helgeson et al. |
| 2002/0111210 A1 | 8/2002 | Luciano, Jr. et al. |
| 2002/0116291 A1* | 8/2002 | Grasso et al. .................. 705/27 |
| 2004/0221244 A1 | 11/2004 | Baldino |

FOREIGN PATENT DOCUMENTS

| | | |
|---|---|---|
| EP | 0785535A1 A1 | 7/1997 |
| EP | 0944019 A2 | 9/1999 |
| WO | 9847104 A1 | 10/1998 |
| WO | 0104790 A1 | 1/2001 |

OTHER PUBLICATIONS

Shin, Kyung H.—Office Action dated May 21, 2009; U.S. Appl. No. 11/780,895.

Shin, Kyung H.—Office Action dated Jan. 7, 2010; U.S. Appl. No. 11/780,895.

7856474, U.S. Appl. No. 95/001,557, Action Closing Prosecution, Oct. 14, 2011.

Kobayashi et al., "Information Retrieval on the Web", ACM Computing Surveys, vol. 32 Issue 2, Jun. 2000, pp. 1-47.

Yang et al, "Towards Automatic Sign Translation", Proc. of the Human Language Technology Meeting (HLT-2001), Mar. 2001, 6 pages.

Kopec, G.E. et al, "Document Image Decoding Using Markov Source Models", IEEE Transactions on Pattern Analysis and Machine Intelligence, Jun. 1994, vol. 16. No. 6, pp. 602-617.

Kovesi, "Image features from phase congruency", Videre: Journal of Computer Vision Research, 1999, vol. 1, No. 3. pp. 1-27.

Kruger et al, "ORASSYLL, Object Recognition With Autonomously Learned and Sparse Symbolic Representations Based on Local Line Detectors", XP-000908858.

Kruger, et al. "Object Recognition with Banana Wavelets", Proc. 5th Europ. Symp. Artificial Neural Networks, 1997, pp. 1-7.

Kruger, N. et al, "Determination of Face Position and Pose With a Learned Representation Based on Label Graphs", Ruhr-Universitat Bochum, Bochum, Germany and University of Southern California, Los Angeles, CA, pp. 1-19.

Kruger, N., "An Algorithm for the Learning of Weights in Discrimination Functions Using a priori Constraints", IEEE Transactions on Pattern Analysis and Machine Intelligence, vol. 19, No. 7, Jul. 1997, pp. 764-768.

Zhao, W. et al., "Discriminant Analysis of Principal Components for Face Recognition," Third International Conference on Automatic Face and Gesture Recognition (1998), pp. 336-341.

Kruger, N., "Visual Learning with a priori Constraints", Shaker Verlag, Aachen, Germany, 1998, pp. 1-131.

Zhang, Z., "A Flexible New Technique for Camera Calibration", IEEE Transactions on Pattern Analysis and Machine Intelligence, Nov. 2000, vol. 22, No. 11. pp. 1330-1334.

Kruger, N., et al. "Autonomous Learning of Object Representations Utilizing Self-Controlled Movements", 1998, Proceedings of NN98, pp. 1-5.

Kruger, N., et al, "Object Recognition with a Sparse and Autonomously Learned Representation Based on Banana Wavelets", Internal Report 96-11, Institut fur Neuroinformatik, Dec. 96, pp. 1-24.

Kruger, N., et al. "Object Recognition with Banana Wavelets", European Symposium on Artificial Neural Networks (ESANN97), 1997, pp. 1-6.

Kruger, N., et al, "Principles of Cortical Processing Applied to and Motivated by Tidal Object Recognition", Institut fur Neuroinformatik, Internal Report 97-17, Oct. 97, pp. 1-12.

Zhang et al., "A PDA-based Sign Translator", Proceeding, Foruth IEEE International Conference on Multimodal Interfaces, Oct. 14, 2002, pp. 217-222.

L. Wiskott et al., "Recognizing Faces by Dynamic Link Matching", ICANN '95, 1995, pp. 347-342.

Lades et al.; "Distortion Invariant Object Recognition in the Dynamic Link Architecture", IEEE transactions on computers, Mar. 1993, vol. 42, No. 3, pp. 1-11.

Yao, Y., et al, "Tracking a Dynamic Set of Feature Points", IEEE Transactions on Image Processing, vol. 4, No. 10, Oct. 1995, pp. 1382-1394.

Li, Y. et al., "Validation of Image Defect Models for Optical Character Recognition", IEEE Trans. Pattern Anal. Mach. Intell. vol. 18, Issue. 2, Feb. 1996, pp. 99-107.

Lakshmi, "Cell Phones, Billboards Play Tag", Jul. 10, 2003, pp. 1-3, www.wired.com.

Li, Yongmin et al., "Dynamic Face Recognition Using Identity Surfaces", http://homepages.inf.ed.ac.uk/rbf/CVonline/LOCAL_COPIES/LI1/idsurf/.

Li, Yongmin et al., "Extracting Discriminant Features of Faces Using Kernel Discriminant Analysis", http://www.eecs.qmul.ac.uk/~sgg/identity-surface/kda/index.html.

Liu, Chengjun et al., "Evolutionary Pursuit and Its Application to Face Recognition", IEEE Transactions of Pattern Analysis and Machine Intelligence (Jun. 2000), vol. 22, No. 6, pp. 570-582.

Liu, T. et al., "A Fast Image Segmentation Algorithm for Interactive Video Hotspot Retrieval", CBAIVL 2001, pp. 3-8.

Liu. Y. et al., "Automatic Texture Segmentation for Texture-Based Image Retrieval", Proceedings. 10th International Conference on Multimedia Modelling, Jan. 5-7, 2004, pp. 285-290.

Lowe, D.G. "Object recognition from Local Scale-Invariant Features", Proc. ICCV, Sep. 1999, vol. 2, pp. 1150-1157.

Luong, Q. T., et al, "The Fundamental Matrix, Theory, Algorithm, and Stability Analysis", International Journal of Computer Vision, 1996, pp. 1-46.

Manjunath, B. S., et al, "A Feature Based Approach to Face Recognition", In Proceedings IEEE Conference on Computer Vision and Pattern Recognition, Mar. 1992, pp. 373-378.

Marinez, Aleix M et al., "PCA vesus LDA," IEEE Transactons on Pattern Analysis and Machine Intelligence Feb. 2001, vol. 23, No. 2, pp. 228-233.

Mauer, T., et al, "learning Feature Transformations to Recognize Faces Rotated in Depth", In Proceedings of the International Conference on Artificial Neural Networks, Oct. 9-13, 1995, vol. 1: pp. 353-358.

Mauer, T. et al, "Single-View Based Recognition of Faces Rotated in Depth", In Proceedings of the International Workshop on Automatic Face and Gesture Recognition, Jun. 26, 1995, pp. 248-253.

Mauer, T. et al, "Tracking and Learning Graphs and Pose on Image Sequences of Faces", Proceedings of 2nd International Conference on Automatic Face and Gesture Recognition, Oct. 14-16, 1996, pp. 176-181.

McDonald, G. "Third Voice: Invisible Web Graffiti," PC World, May 18, 1999.

McKenna, S.J., et al, Tracking Facial Feature Points With Gabor Wavelets and Shape Models, Proceedings of the First International Conference on Audio- and Video-Based Biometric Person Authentication, 1997, pp. 1-8.

Mika, Sebastian et al., "Invariant Feature Extraction and Classification in Kernel Spaces", Advances in Neural Information Processing Systems (2000), vol. 12, pp. 526-532.

Mika Sebastian. et al., "A Mathematical Programming Approach to the Kernel Fisher Algonthm", Advances in Neural Information Processing Systems (2001), vol. 13, pp. 591-597.

Sara, R et al "Fish-Scales: Representing Fuzzy Manifolds", Proceedings International Conference Computer Vision, ICCV '98, pp. 811-817.

Moghaddam, Baback, "Principal Manifolds and Sayesian Subspaces for Visual Recognition", Proceedings of the Seventh IEEE International Conference on Computer Vision (1999), vol. 2 pp. 1131-1136.

Mukherjea, S. et al., "AMORE: A World Wide Web Image Retrieval Engine", C&C Research Laboratories, NEC USA Inc., vol. 2, No. 3, pp. 115-132.

Okada et al. "The Bochum/USC Face Recognition System", Published in Face Recognition From Theory to Applications, 1998, pp. 186-205.

Penev et al.; Local Feature Analysis: A General Statistical Theory for Object Representation; vol. 7, No. 3, 1996, pp. 477-500.

Peters, G., et al, "Learning Object Representations by Clustering Banana Wavelet Responses", Proc 1st Int Workshop Sta (STIPR97) 1997, pp. 1-6.

Phillips, P. Jonathan, "Support Vector Machines Applied to Face Recognition", Advances in Neural Information Processing Systems II, 1999, pp. 1-7.

Phillips, P. Jonathon et al., "The FERET Evaluation Methodology for Face-Recognition Algorithms", IEEE Transactions on Pattern Analysis and Machine Intelligence (Oct. 2000), vol. 22, No. 10, pp. 1090-1104.

Pighin, F., et al, "Synthesizing Realistic Facial Expressions from Photographs", Proceedings of the 25th annual conference on Computer graphics and interactive techniques, (SIGGRAPH '98), Jul. 1998, pp. 75-84.

Platt, John C., et al., "Large Margin DAGs for Multiciass Classification", Advances in Neural Information Processing Systems (2000), vol. 12, pp. 547-553.

Po, L-M. et al , "A Novel Four-Step Search Algorithm for Fast Block Motion Estimation", IEEE Transactions on Circuits and Systems for Video Technology, Jun. 1996, vol. 6, Issue 3, pp. 313-317.

Potamianos, G. et al., "Discriminative Training ofHMM Stream Exponents for Audio Visual Speech Recognition", Proc. Int. Conf. Acoust. Speech Signal Process, Seattle, vol. 6, 1998, pp. 3733-3736.

Rosin, P.L. et al., "Image Difference Threshold Strategies and Shadow Detection", Proceedings of the 6.sup.th British Machine Vision Conference, vol. 1, 1995, pp. 1-10.

Roth. M.T. et al,: "The Garlic Project", Proc. of the 1996 ACM SIGMOD International Conference on Management of Data, Montreal, Quebec, Canada, Jun. 4. 1996, pp. 557.

Roy, S., et al. "A Maximum Flow Formulation of the N-Camera Stereo Correspondence Problem", IEEE, Proceedings of International Conference on Computer Vision, Bombay, India, Jan. 1998, pp. 1-6.

Sara, R. et al "3-D Data Acquision and interpretation for Virtual Reality and Telepresence", Proceedings IEEE Workshop Computer Vision for Virtual Reality Based Human Communication, Jan. 1998, pp. 1-7.

Sara, R., et al, "On Occluding Contour Artifacts in Stereo Vision", IEEE, Proceedings of International Conference Computer Vision and Pattern Recognition, Jun. 17-19, 1997, pp. 852-857.

Scholkopf, Bernhard et al., "Nonlinear Component Analysis as a Kernel Eigenvalue Problem", Neural Computation vol. 10, Issue 5, Jul. 1, 1998, pp. 1299-1319.

Scholkopf, Bernhard, et al., "Kernel Principal Component Analysis," Advances in Kernel Methods—Support Vector Learning, MIT Press (1999), pp. 327-352.

Senior, A.W., "Face and Feature Finding for a Face Recognition System", Second International Conference on Audio- and Video-based Biometric Person Authentication, Washington, Mar. 1999., pp. 154-159.

Stiefethagen, R., et al., "Real-Time Lip-Tracking for Lipreading," Interactive Systems Labortories, University of Karlsruhe, Germany and Carnegie Mellon University, U.S.A., pp. 1-4, Apr. 27, 1998.

Swets, Daniel L. et al,, "Hierarchical Discriminant Analysis for Image Retrieval", IEEE Transactions on Pattern Analysis and Machine Intelligence (May 1999), vol. 21, No. 6, pp. 386-401.

Takeuchi et al,. "Evaluation of Image-Based Landmark Recognition Techniques", The Robotics Institute, Carnegie Mellon University, Jul. 1998, pp. 1-16.

Teh, Yee Whye et al., "Rate-coded Restricted Boltzmann Machines for Face Recognition", Advances in Neural Information Processing Systems (2001), vol. 13, pp. 908-914.

Tenenbaum, Joshua B. et al., "A Global Geometric Framework for Nonlinear Dimensionality Reduction", Science (Dec. 2000), vol. 290, pp. 2319-2323.

Tomasi, C., et al., "Stereo Without Search", Proceedings of European Conference on Computer Vision, Cambridge, UK, 1996, pp. 1-14.
Triesch, J., et al., "Robust Classification of Hand Postures Against Complex Backgrounds", Proceedings of the Second International Conference on Automatic Face and Gesture Recognition, Killington, VT, Oct. 1996, pp. 1-6.
Turk, M., et al, "Eigenfaces for Recognition", Journal of Cognitive Neuroscience, vol. 3, No. 1, pp. 71-86, 1991.
Viola et al., "Rapid object detection using a boosted cascade of simple features", Proc. of IEEE Conf. on Computer Vision and Pattern Rec., Dec. 2001, pp. 1-9.
WAP Forum (2001), WAP MMS Architecture Overview, Version 25. 2001.
Weston, J. et al., "Feature Selection for SVMs", Proceedings of the Advances in Neural Information Processing Systems (2001), vol. 13, pp. 668-674.
Wiskott. L. "Phantom Faces for Face Analysis", Pattern Recognition, vol. 30, No. 6, pp. 837-846, 1997.
Wiskott., L., "Phantom Faces for Face Analysis", Internal Report, IR-INI 96-06, Institut fur Neoroinformatik. Ruhr-Universitat,Bochum, Germany, Apr. 1996, pp. 1-12.
Wiskott, L., et al, "Face Recognition and Gender Determination", Proceedings of International Workshop on Automatic Face and Gesture Recognition, pp. 92-97, Zurich CH, Jun. 26, 1995.
Wong, R., et al, "PC-Based Human Face Recognition System", Proceedings of the 34th Midwest Symposium on Circuits and Systems, May 14-17, 1991, vol. 2, pp. 641-644.
Wurtz, R., "Object Recognition Robust Under Translations, Deformations, and Changes in Background", IEEE Transactions on Patern Analysis and Machine intelligence, vol. 19, No. 7, Jul. 1997, pp. 769-775.
Wurtz, R., et al, "Corner Detection in Color Images by Multiscale Combination of End-stopped Cortical Cells", Artificial Neural Networks—ICANN '97, Lecture Notes in Computer Science, 1997., vol. 1327, pp. 901-906.
Yang et al., "An Automatic Sign Recognition and Translation System", Proceedings of the 2001 workshop on Perceptive user interfaces, 2001, pp. 1-8.
Yang et al., "Smart Sight: A Tourist Assistant System", 3rd Int'l Symposium on Wearable Computers, Oct. 1, 1999, pp. 73-78.
Adini, Yael et al., "Face Recognition: The Problem of Compensating for Changes in Illumination Direction", IEEE Transactions on Pattern Analysis and Machine Inteliigence (Jul. 1997), vol. 19, No. 7, pp. 721-732.
Aigrain, P. et al., "Content-Based Representation and Retrieval of Visual Media: A State of the Art Review", Multimedia Tools and Applications. vol. 3, 1996, pp. 179-202.
Akimoto, T . et al., "Automatic Creation of 3-D Facial Models", IEEE Computer Graphics & Applications., Sep. 1993, pp. 16-22.
Ayache, N., et al, "Rectification of Images for Binocular and Trinocular Stereovision", In IEEE Poceedings of 9th International Conference on Pattern Recognition, 1988, pp. 11-16.
Baback Moghaddam et al., "Probabilistic Visual Learning for Object Representation", IEEE Transactions on Pattern Analysis an Machine Intelligence, vol. 19, No. 7, Jul. 1997, pp. 896-710.
Baird; H., "The State of the Art of Document Image Degradation Modeling", In Proc. of the 4.sup.th IAPR International Workshop on Document Analysis Systems, Rio de Janeiro, Brazil, 2000, pp. 1-16.
Baird, H S., "Document Image Defect Models and Their Uses", Proc , IAPR 2.sup.nd International Conference on Document Analysis and Recognition, Oct. 20-22, 1993, pp. 62-67.
Bartlett, Marian Stewart et al., "Independent Component Representations for Face Recognition", Proceedings of the SPIE Symposium on Electronic Imaging: Science and Technology; Conference on Human Vision and Electronic Imaging III, San Jose, CA (Jan. 1998), pp. 528-539.
Bartlett, Marian Stewart et al., "Viewpoint Invariant Face Recognition Using Independent Component Analysis and Attractor Networks", Advances in Neural Information Processing Systems (1997), vol. 9, pp. 817-823.
Bartlett, Marian Stewart, "Face Image Analysis by Unsupervised Learning and Redundancy Reduction", Doctorial Dissertation, at University of California at San Diego (1998).

Baudat, G. et al., "Generalized Discriminant Analysis Using a Kernel Approach," Neural Computation, vol. 12, No. 10, Oct. 2000, pp. 2385-2404.
Beis et al., "Shape indexing Using Approximate Nearest-Neighbour Search in High-Dimensional Spaces", CVPR '97, 1997; pp. 1-7.
Belhumeur; P., "A Bayesian Approach to Binocular Stereopsis", International Journal of Computer Vision, 19 (3), 1996, pp. 237-260.
Belhumeur, P.N. et al., "Eigenfaces vs. Fisherfaces: Recognition Using Class Specfic Linear Projection," IEEE Transactions on Pattern Analysis and Machine Intelligence, vol. 19, No. 7, Jul. 1997, pp. 1-10.
Belhumeur, Peter N. et al., "Eigenfaces vs. Fisherfaces: Recognition Using Class Specific Linear Projection," IEEE Transactions on Pattern Analysis and Machine intelligence (Jul. 1997), vol. 19, No. 7, pp. 711-720.
Bell, Anthony J. et al., "An Information-Maximisation Approach to Blind Separation and Blind Deconvolution," Neural Computation (1995), vol. 7, No. 6, pp. 1004-1034.
Bishop, Christopher M. et al., "Non-linear Bayesian Image Modelling," Proceedings of the Sixth European Conference on Computer Vision (2000), vol. 1, pp. 3-17.
Brassil, J. et al., "Hiding Information in Document Images," Proc. Conf. Information Sciences and Systems (CISS-95), Mar. 1995, Johns Hopkins University, Baltimore, MD, pp. 482-489, cited by other.
Buhmenn, J. et al, "Distortion Invariant Object Recognition by Matching Hierarchically Labeled Graphs", In Proceedings IJCNN international Conference of Neural Networks, Wash., DC, Jun. 1989, pp. 155-159.
C. Bregler et al., "Eigenlips for Robust Speech Recognition", International Conference on ICASSP-94., 1994 IEEE, vol. 2, Apr. 19-22, 1994, pp. II/669-II/672.
Burges et al., "A Tutorial on Support Vector Machines for Pattern Recognition", Journal Data Mining and Knowledge Discovery, vol. 2 Issue 2, Jun. 1998, pp. 121-167.
C Neti et al., "Audio-Visual Speaker Recognition for Video Broadcast News", Proceedings of the ARPA HUB4 Workshop, Washington, D.C., Mar. 1999, pp. 1-3.
Canny, J., "A Computational Approach to Edge Detection," IEEE Transactions on Pattern Analysis and Machine Intelligence, Nov. 1986, pp. 679-714, vol. PAMI-8, No. 6.
Chibelushi, et al. "Robustness of Head Pose Estimation based on Gabor Wavelets and Graph Matching", IEEE, vol. 1, Jul. 15, 1999, pp. 38-41.
Cohen, P. et al.,"The Handbook of Artificial Intelligence", William Kaufmann, Inc., Los Altos, Calif, 1982, pp. 127-321.
Cover, T.M. et al., "Nearest Neighbor Pattern Classification," IEEE Transactions on Information Theory, Jan. 1967, pp. 21-27, vol. 13, No. 1, pp. 21-27.
DeCarlo, D., et al, "The Integration of Optical Flow and Deformable Models with Applications to Human Face Shape and Motion Estimation", In Proceedings, CVPR '96, pp. 231-238.
Devernay, F., et al, "Computing Differential Properties of 3-D Shapes from Stereoscopic Images without 3-D Models", INRIA, RR-2304, 1994, pp. 1-28.
Di Stefano, L. et al., "A Simple and Efficient Connected Components Labeling Algorithm," International Conference on Image Analysis and Processing, 1999, pp. 322-327.
Duda, R. O. et al., "Use of the Hough Transformation to Detect Lines and Curves in Pictures," Communications of the ACM, Jan. 1972, vol. 15, No. 1, pp. 11-15.
Fei-Fei, et al., "Learning Generative Visual Models from Few Training Examples: An Incremental Bayesian Approach Tested on 101 Object Cat.", Journal Computer Vision and Image Understanding, vol. 106 Issue 1, Apr. 2007, pp. 1-9.
Fischler, et al., "The Representation and Matching of Pictorial Structures," IEEE Transaction on Computers, Jan. 1973.
Fleet, D J., et al, "Computation of Component Image Velocity from Local Phase Information", International Journal of Computer Vision, vol. 5, No. 1, 1990, pp. 77-104.
Freund, Y. et al., "A Short Introduction to Boosting," Journal of Japanese Society for Artificial Intelligence, Sep. 1999, vol. 14, No, 5, pp. 771-780.

Gee, A.H. et al., "Determining the Gaze of Faces in Images", Univeristy of Cambridge, Cambridge, England.vol. 12, Issue 10, Mar. 1994, pp. 639-647.

Gionis, A., et al., "Similarity search in high dimensions via hashing" Proc. of 25th Intl. Conf. on Very Large Data Bases (VLDB), 1999.

Hanel et al., "MARCO: MAp Retrieval by Content", IEEE Trans. on Pattern Analysis and Machine Intelligence, special issue on digital libraries: representation and retrieval, vol. 18, No. 8, Aug. 1996, pp. 783-798.

Hecht, D., "Printed Embedded Data Graphical User Interfaces," IEEE Computer, vol. 34, No. 3, 2001, pp. 47-55.

Hjelmas, E. et al., "Face Detection: A Survey," Computer Vision and Image Understanding, 2001, vol. 83, pp. 236-274.

Ho, T.K et al., "Decision Combination in Multiple Classifier Systems," IEEE Transactions on Pattern Analysis and Machine Intelligence, Jan. 1994, vol. 16, No. 1, pp. 66-75.

Hull, J. J., "Document Image Similarity and Equivalence Detection," International Journal on Document Analysis and Recognition, Aug. 18-20, 1997, vol. 1 , pp. 37-42.

Hull, J., "Document Image Skew Detection: Survey and Annotated Bibliography", Document Analysis Systems II, World Scientific, 1998, pp. 40-64.

Hull, J.J. et al., "Document Image Matching Techniques", Symposium on Document Image Understanding Technology, Annapolis, MD, Apr. 30-May 2, 1997, pp. 31-35.

Hull, J.J., "Document Image Matching and Retrieval with Multiple Distortion-Invariant Descriptors", International Association tor Pattern Recognition Workshop on Document Analysis Systems, Jan. 1, 1995, pp. 375-396.

Hull, J.J., "Document image Matching on CCITT Group 4 Compressed Images", SPIE Conference on Document Recognition IV, Feb. 8, 1997, pp. 82-87.

Hyvarinen, Aapo et al., "A Fast Fixed-Point Algorithm for Independent Component Analysis", Neural Computation (1997), vol. 9, No. 7, pp. 1483-1492.

Kanungo T. et al., "A Downhill Simplex Algorithm for Estimating Morphological Degradation Model Parameters", University of Maryland Technical Report, LAMP-RT-066, Feb. 2001, 15 pages.

Kanungo, T. et al., "Global and Local Document Degradation Models", 1993, Proceedings of the Second International Conference on Document Analysis and Recognition, Oct. 20-22, 1993, pp. 730-734.

Kefalea "Object Localization and Recognition for a Grasping Robot", IEEE, Aug. 31, 1998, vol. 4, pp. 2057-2062.

Khoubyari, S. et al., "Font and function word identification in document recognition", Computer Vision and Image Understanding, Jan. 1996, vol. 63, No. 1 pp. 66-74.

*Wireless Recognition Technologies LLC v. A9.COM, Inc., AMAZON. COM, Inc., Google, Inc., Nokia, Inc. and Ricoh Innovations, Inc.*, Complaint for Patent Infringement, Civil Action No. 2.10-cv-364, Nov. 11, 2010, 11 pgs.

*Wireless Recognition Technologies LLC v. Nokia Corporation and Ricoh Company, Ltd.*, Complaint for Patent Infringement, Civil Action No. 2:10-cv-365, Sep. 14, 2010, 6 pgs.

*Wireless Recognition Technologies LLC v. A9.COM, Inc., AMAZON. COM, Inc., Google, Inc., Nokia, Inc. and Ricoh Innovations, Inc.*, Complaint for Patent Infringement. Civil Action No. 2:10-cv-577, Dec. 21, 2010, 11 pgs.

*Wireless Recognition Technologies LLC v. Nokia Corporation and Ricoh Company, Ltd.*, Complaint for Patent Infringement, Civil Action No. 2:10-cv-578, Dec. 21. 2010. 6 pgs.

*Wireless Recognition Technologies LLC v. A9.COM, Inc., AMAZON. COM, Inc., Google, Inc., Nokia, Inc. and Ricoh Innovations, Inc.*, Answer of Nokia, Inc. to Wireless Recognition Technologies LLC's Complaint for Patent Infringement, Civil Action No. 2:10-cv-364, Nov. 11, 2010, 11 pgs.

*Wireless Recognition Technologies LLC v. A9.COM, Inc., AMAZON. COM, Inc., Google, Inc., Nokia, Inc. and Ricoh Innovations, Inc.*, Defendant Google, Inc.'s Answer to Plaintiffs Complaint for Patent Infringement, Civil Action No. 2:10-cv-364, Nov. 12, 2010, 16 pgs.

*Wireless Recognition Technologies LLC v. A9.COM. Inc . AMAZON. Com, Inc.. Goggle, Inc., Nokia, Inc. and Ricoh Innovations, Inc.*, Defendant Ricoh Innovations, Inc.'s Answer, Affirmative Defenses, and Counterclaims, Civil Action No. 2:10-cv-364, Nov. 12, 2010, 12 pgs.

*Wireless Recognition Technologies LLC v. A9.COM, Inc., AMAZON. COM, Inc., Goggle, Inc., Nokia, Inc. and Ricoh Innovations, Inc.*, Amazon, Inc.'s Answer to Plaintiff s Complaint for Patent Infringement and Counterclaims, Civii Action No. 2:10-cv-364, Nov. 17, 2010, 15 pgs.

*Wireless Recognition Technologies LLC v. A9.COM. Inc., AMAZON. COM, Inc., Goggle, Inc., Nokia, Inc. and Ricoh Innovations, Inc.*, A9.com, Inc.'s Answer to Plaintiff's Complaint for Patent Infringement and Counterclaims, Civil Action No. 2:10-cv-364, Nov. 22, 2010, 15 pgs.

*Wireless Recognition Technologies LLC v. Nokia Corporation and Ricoh Company, Ltd.*, Defendant Ricoh Company Ltd's Answer, Affirmative Defenses, and Counterclaims, Civil Action No, 2.10-cv-365, Jan. 10, 2011, 9 pgs.

*Wireless Recognition Technologies LLC v. Nokia Corporation and Ricoh Company, Ltd.*, Answer of Nokia Corporation to Wireless Recognition Technologies LLC's Complaint for Patent Infringement, Civil Action No. 2:10-cv-365, Jan. 10, 2011, 8 pgs.

*Wireless Recognition Technologies LLC v. A9.COM, Inc., AMAZON. COM, Inc., Google, Inc., Nokia, Inc. and Ricoh Innovations, Inc.*, Defendant A9.com, Inc.'s Answer to Plaintiff's Complaint for Patent Infringement and Counterclaims, Civil Action No. 2:10-cv-577, Feb. 7, 2011, 16 pgs.

*Wireless Recognition Technologies LLC v. A9.COM, Inc., AMAZON. COM, Inc., Google, Inc., Nokia, Inc. and Ricoh Innovations, Inc.*, Defendant Ricoh Innovations. Inc.'s Answer, Affirmative Defenses, and Counterclaims, Civil Action No. 2:10-cv-577, Feb. 8, 2011, 12 pgs.

*Wireless Recognition Technologies LLC v. A9.COM, Inc., AMAZON. COM, Inc., Google, Inc., Nokia, Inc. and Ricoh Innovations, Inc.*, Defendant Google, Inc.'s Answer to Plaintiff's Complaint for Patent Infringement and Counterclaims. Civil Action No. 2:10-cv-577, Feb. 8, 2011, 16 pgs.

*Wireless Recognition Technologies LLC v. A9.COM, Inc., AMAZON. COM, Inc., Google, Inc., Nokia, Inc. and Ricoh Innovations, Inc.*, Defendant Amazon.com, Inc.'s Answer to Plaintiff's Complaint for Patent Infringement and Counterclaims, Civil Action No. 2:10-cv-577, Mar. 7, 2011, 15 pgs.

*Wireless Recognition Technologies LLC v. A9.COM, Inc., AMAZON. COM, Inc., Google, Inc , Nokia, Inc, and Ricoh Innovations, Inc.*, Answer of Nokia, Inc. to Wireless Recognition Technologies LLC's Complaint for Patent Infringement, Civil Action No. 2:10-cv-577, Mar. 14, 2011, 11 pgs.

*Wireless Recognition Technologies LLC v. Nokia Corporation and Ricoh Company, Ltd.*, Answer of Nokia Corporation to Wireless Recognition Technologies LLC's Complaint for Patent Infringement, Civil Action No. 2:10-cv-578, Apr. 13, 2011, 8 pgs.

*Wireless Recognition Technologies LLC v. Nokia Corporation and Ricoh Company, Ltd.*, Defendant Ricoh Company Ltd.'s Answer, Affirmative Defences, and Counterclaims, Civil Action No. 2:10-CV-578, May 13, 2011, 9 pgs.

\* cited by examiner

METHOD AND APPARATUS FOR SHARING INFORMATION USING A HANDHELD DEVICE

PRIORITY CLAIM AND RELATED APPLICATIONS

Benefit of priority under 35 USC 120 is claimed based on U.S. patent application Ser. No. 11/780,895, titled, "Method and Apparatus for Sharing Information Using a Handheld Device," filed on Jul. 20, 2007, which is a continuation of U.S. Pat. No. 7,392,287, titled, "Method and Apparatus for Sharing Information Using a Handheld Device," filed on Mar. 27, 2001. The entirety of both U.S. application Ser. No. 11/780, 895 and U.S. Pat. No. 7,392,287 are incorporated herein by reference. This application is a continuation of related U.S. patent application Ser. No. 11/780,895, filed on Jul. 20, 2007 now U.S. Pat. No. 7,856,474, which is a continuation of Ser. No. 09/818,003, filed Mar. 27, 2001, now U.S. Pat. No. 7,392, 287.

FIELD

The present invention relates generally to sharing information and, more particularly, to identifying a document from information input to a handheld device and forwarding the document to a designated recipient.

BACKGROUND

Sharing information from documents is generally a manual and time-consuming process. When an individual reads a newspaper or magazine article and wishes to share the article with someone, he must endure a multi-stepped process fraught with frustration and potential for mistake.

A number of conventional means for sharing documents are available, although none are particularly palatable. In the above example, to share the newspaper or magazine article, the individual would have to choose one of the following means: physically tear out or photocopy the article and mail it, photocopy the article and fax it, read the article over the phone, scan the article into a computer and send it electronically, or visit the website for the newspaper or magazine, find the article, then send the uniform resource locator ("URL") for the website to the desired recipient.

The tasks above are needlessly time consuming and problematic. In the time required to manipulate the physical document and arrange for sending, the recipient could have already read the article and discussed it with the sender, if only the recipient had received the article sooner. Moreover, with all of the effort required on the part of the sender to coordinate sending the document, there is a strong likelihood the sender may lose interest altogether and not even attempt to send the article.

SUMMARY

One aspect of the present invention relates to sending information to a data processing apparatus for identification of a document having the information. A handheld device having a memory is capable of communicating with the data processing apparatus. Information is captured from the document. The captured information is stored in the memory of the handheld device as document data. A communications path is established between the handheld device and the data processing apparatus. The document data is retrieved from the memory of the handheld device and sent to the data processing apparatus through the communications path for identification of the document.

Another aspect of the present invention relates to identifying the document for sharing with a recipient, in the data processing apparatus. Reference documents are provided. Each reference document has reference data stored in a memory. The document data received from the handheld device is associated with one of the reference documents. At least a portion of the received document data is extracted as scanning data. The reference data is retrieved from the memory. The scanning data is compared with the reference data. When the scanning data matches at least a portion of the reference data of one of the reference documents, the one reference document is selected as the identified document.

BRIEF DESCRIPTION OF THE FIGURES

The invention may be better understood with reference to the following figures. The components in the figures are not necessarily to scale, emphasis instead being placed upon clear illustration of principles.

DETAILED DESCRIPTION

Figure 1:
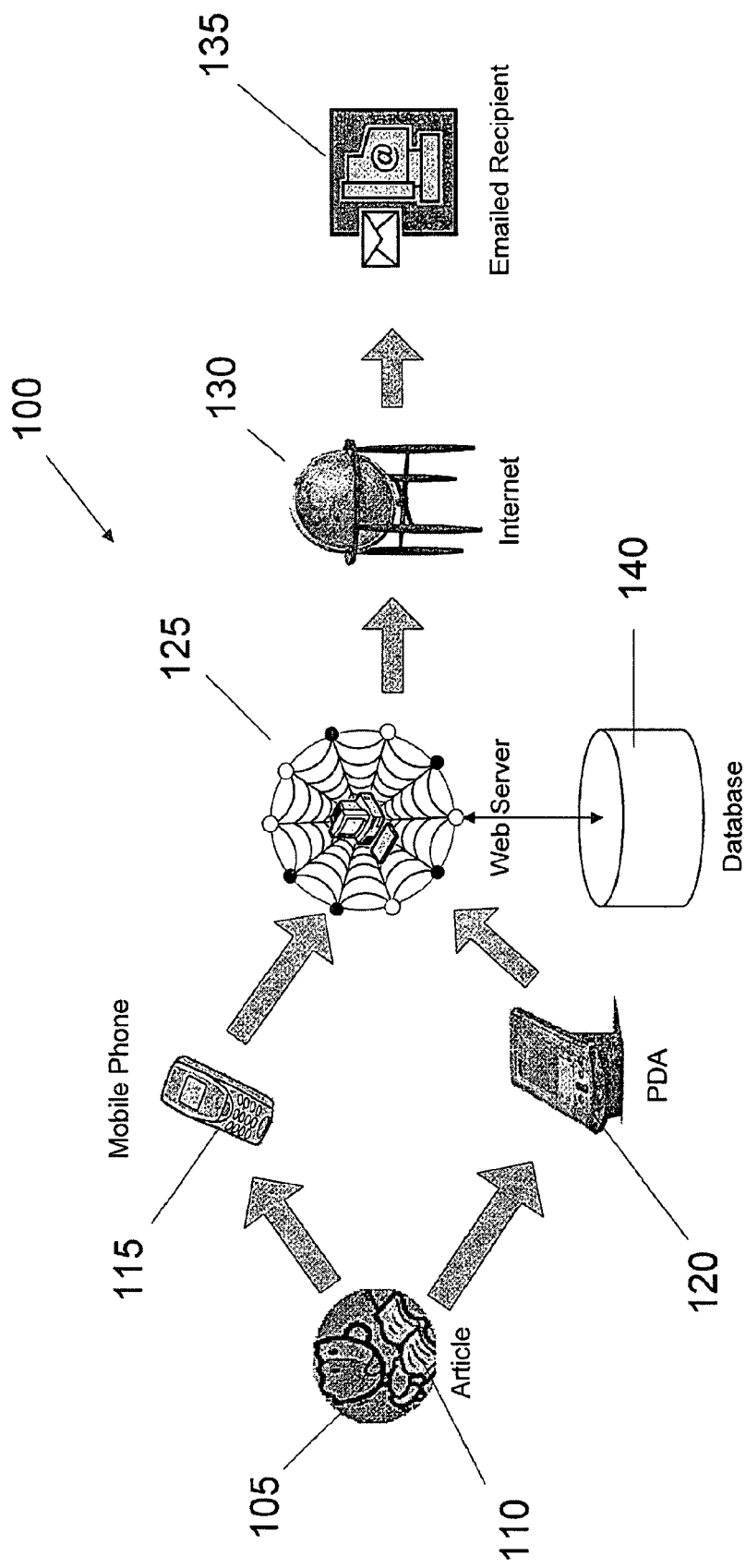
FIG. 1 is a block diagram of a system 100 for identifying a document and forwarding the document to a designated recipient, constructed according to an exemplary embodiment of the present invention.

FIG. 1 is a block diagram of a system 100 for identifying a document and forwarding the document to a designated recipient, constructed according to an exemplary embodiment of the present invention. In FIG. 11, a user 105, also referred to herein as a sender, locates a data source such as document 110. In some examples, the document 110 is a physical document such as an article in a periodical like a newspaper or magazine. In other examples, the document 110 is in electronic form, such as a word processing document or HTML document displayed on a handheld device or other data processing apparatus. Upon reading the document 110, the user 105 realizes he has several associates or desired recipients who, he believes, would also be interested in reading the document 110.

In FIG. 1, the user 105 operates a handheld device such as a mobile phone 115 or personal digital assistant ("PDA") 120. Other exemplary handheld devices include the following sold under their respective trademarks: Handspring VISOR™, Palm PALM™, HP JORNADA™, Compaq IPAQ™, Research In Motion BLACKBERRY™, NEOPOINT® Smart Phone, PSION® Series 7, NOKIA® Communicator 9000il, Samsung SCH-3500 Smart Phone, and SPRINT PCS TOUCHPOINT™. Other suitable handheld devices include watches and combinations of the above handheld devices. Such watches and devices include Qbe Personal Computing Tablet, QUBIT™ Tablet, Intel Tablet, ONHAND™ PC, daVinci, Franklin REX, Sharp ZAURUS®, Motorola PAGEWRITER® 2000x, and Sharp telMail TM-20.

In FIG. 1, each of the handheld devices 115 and 120 includes a memory for storing data, such as a memory 310 described below with reference to FIG. 3. The various handheld devices operated by user 105 are capable of communicating with a data processing apparatus such as a server 125. A communications path can be established between the handheld devices and the server 125 by conventional techniques, including cellular and other wireless means.

In some exemplary embodiments, part or all of server 125 is implemented as the data processing apparatus 300 described with reference to FIG. 3. World Wide Web ("Web") servers may be readily incorporated. The server 125 is coupled to and in communication with a data network 130 such as the Internet, using conventional techniques understood by those skilled in the art. The server 125 is in communication with a storage means 140 such as a database or other suitable repository. In one example, server 125 is directly coupled to repository 140. In another example, server 125 communicates with repository 140 via data network 130. Reference data is stored in storage means 140 for use by server 125, as explained in greater detail below.

In FIG. 1, one example of data network 130 is the Internet. In other examples, data network 130 is any network with sufficient bandwidth to transmit data signals received from handheld devices such as mobile phone 115 and PDA 120. Suitable networks include frame relay (FR) networks, ATM networks, wide area networks (WAN), and local area networks (LAN). Other suitable networks 130 include satellite transmission, radio broadcasting, cable television broadcasting, direct line-of-site transmission, telecom fiber optic transmission, cellular transmission, and wireless transmission, as will be understood by the skilled artisan.

In FIG. 1, a recipient 135 is also capable of communicating with data network 130 by conventional means. For example, recipient 135 may be or include a data processing apparatus or computer system such as a laptop computer, handheld device, cellular phone with data network capabilities, and other devices capable of receiving data signals such as e-mail messages from data network 130.

Figure 2:
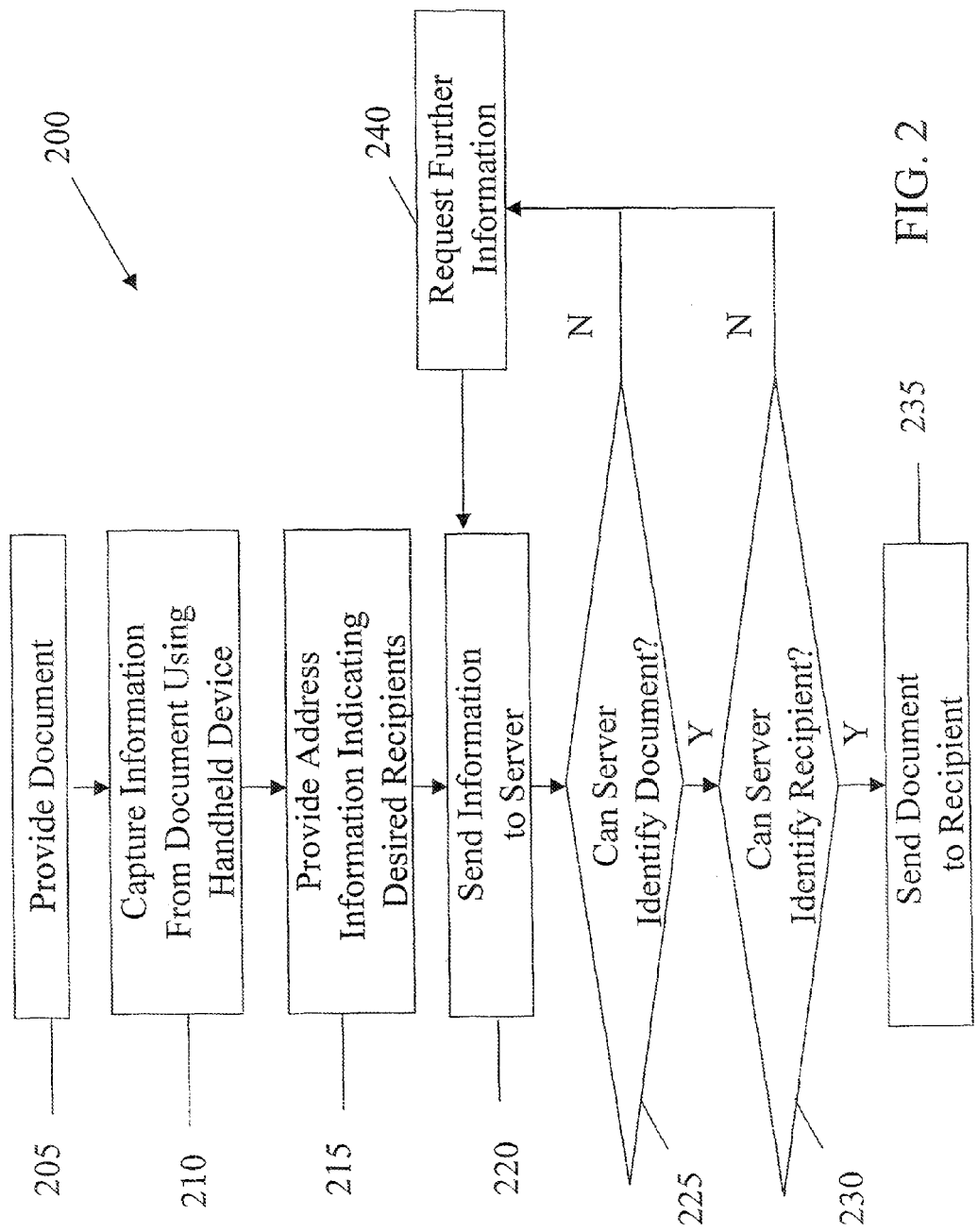
FIG. 2 is a flow diagram of a method 200 for identifying a document and forwarding the document to a designated recipient, performed in accordance with an exemplary embodiment of the present invention.

FIG. 2 is a flow diagram of a method 200 for identifying a document and forwarding the document to a designated recipient, performed in accordance with an exemplary embodiment of the present invention. In FIG. 2, the method begins with user 105 identifying document 110 in step 205.

In step 210, the user 105 captures information from the document 110. In some exemplary embodiments, the handheld device includes an input device such as a microphone and is thus capable of receiving audio voice signals. The user 105 can convey information by speaking into the microphone. In an alternative embodiment, the microphone is physically separated from the handheld device, yet coupled to the device so the audio signals can easily pass to the device for storage in memory. In another exemplary embodiment, the handheld device is provided with a scanning mechanism. In one example, the scanning mechanism is provided as a "plug-in" cartridge that interfaces with the handheld device, as with the Handspring VISOR™ PDA. The scanner can be coupled to the handheld device by other means for scanning the information from the document and conveying the information to the handheld device for storage. Conventional scanners may be used, as will be understood by those skilled in the art. Other conventional means for converting printed text from the document to digital data may readily be used.

Various types of information can be captured from the document and stored in the handheld device. Suitable information includes: title of the document 110, author, publication name (e.g., name of newspaper or magazine), and the date of publication for document 110. The captured information can include one or more of these types of information and/or other types of information.

When the information is captured by the scanner or scanning mechanism, the scanned information is converted to digital data using conventional techniques. Also, audio signals received by the microphone are converted to digital data using a digital-to-audio ("D/A") converter or other suitable means. The digital data is then stored in a memory within the handheld device as captured information or document data.

In FIG. 2, the user also provides address information identifying a receiving address for desired recipient 135 in step 215. In one example, an e-mail address for the desired recipient is spoken into the microphone of the handheld device using techniques described above. In another example, the name of the recipient is spoken into the device for a later table lookup operation performed by the server 125. In yet another example, an e-mail address or mailing address is typed into the handheld device by the user using a keypad incorporated for data entry. This address information is stored in the memory of the handheld device.

In FIG. 2, after the document information is captured and the address information received by the handheld device, a communications path is established between the handheld device and the server 125. In some exemplary embodiments, such communications are established via one or more of the many types of data networks 130 described above. In step 220, the captured document information and the address information are retrieved from the memory in the handheld device and sent to the server 125 via the established communications path. The server 125 then receives the captured document information and the address information.

In step 225, the server 125 then extracts at least a portion of the received document data as scanning data. This extraction may be performed using conventional voice recognition programs to extract portions of digital audio signals and convert these to text-based digital data. Suitable voice recognition programs include Dragon NATURALLY SPEAKING®, Lernout & Hauspie L&H VOICE XPRESS™, and Lernout & Hauspie Power Translator Pro. In step 225, the server attempts to identify the source document 110 using the captured information. To this end, server 125 cross-references the extracted portion of the information with reference data associated with a plurality of reference documents stored in repository 140. That is, the data processing apparatus accesses the reference data, and compares the scanning data with the reference data. In an alternative embodiment, this cross-referencing operation is performed by a human who uses the extracted portion of the information to index physical documents to identify one or more documents having information matching the extracted portion of information.

In step 230, the server 125 extracts the address data from the information received from the handheld device. For digital address data representing an e-mail address, phone number, or postal mailing address spoken into the microphone, a conventional voice recognition program is used to convert the voice-based address data to text-based digital data. The server 125 then attempts to identify the recipient using the text-based digital data. In some embodiments, when the address data is spoken or typed exactly, the text-based address data is used directly as the mailing address. In other embodiments, a table lookup operation is performed by server 125 using the text-based address data by cross-referencing a directory or listing of e-mail addresses associated with real names. This listing is maintained in storage medium 140. In an alternative embodiment, this table lookup operation is performed by a human, as will be appreciated by those skilled in the art.

Proceeding to step 240, when the server cannot identify one of the referenced documents in step 225, or server 125 cannot identify recipient 135 from the address information 230, server 125 sends a signal to the handheld device operated by the user, such as an e-mail message passed via data network 130. This signal includes a message requesting further information and/or clarification of the data already submitted. For example, if the system identified two or more documents matching the captured information, the message prompts the user to specify which of the identified documents to send to recipient 135. Alternatively, the user may be prompted to re-enter address information. The method then returns to step 220, when the user sends -such information to the server. In steps 225 and/or 230, the server again attempts to identify the document and/or identify the recipient.

In FIG. 2, the loop represented by steps 220, 225, 230, and 240, repeats as necessary until the proper information is gathered by server 125. In step 235, the identified document can then be sent to the person identified in the identification information. Depending on the type of address information input by the user 105, this sending can be performed by attaching an electronic copy of the identified document to an e-mail message and sending the message to a designated e-mail address of the recipient, or sending an electronic copy of the document by facsimile transmission to a designated phone number. Alternatively, a hard copy of the document can be mailed to a residential mailing address for the recipient.

Figure 3:
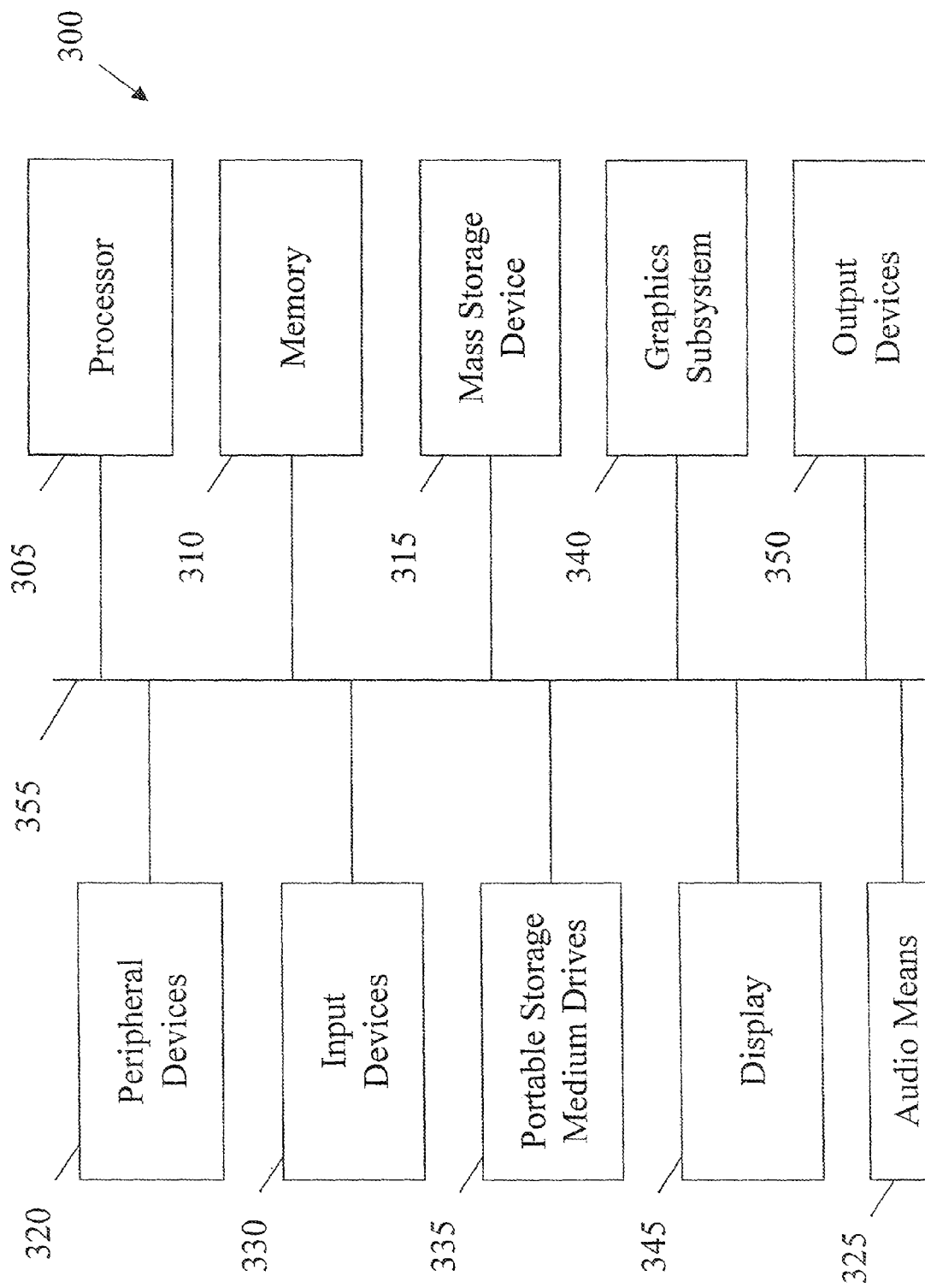
FIG. 3 is a block diagram of a data processing apparatus 300 constructed according to an exemplary embodiment of the present invention.

FIG. 3 is a block diagram of a data processing apparatus 300 that can be incorporated as part of both the handheld device and/or the server 125 in FIG. 1. The data processing apparatus 300 includes a processor 305 for executing program instructions stored in a memory 310. In some embodiments, processor 305 includes a single microprocessor, while in others, processor 305 includes a plurality of microprocessors to define a multi-processor system. The memory 310 stores instructions and data for execution by processor 305, including instructions and data for performing the methods described above. Depending upon the extent of software implementation in data processing apparatus 300, the memory 310 stores executable code when in operation. The memory 310 includes, for example, banks of read-only memory (ROM), dynamic random access memory (DRAM), as well as high-speed cache memory.

In FIG. 3, within data processing apparatus 300, an operating system comprises program instruction sequences that provide a platform for the methods described above. The operating system provides a software platform upon which application programs may execute, in a manner readily understood by those skilled in the art. The data processing apparatus 300 further comprises one or more applications having program instruction sequences for performing the methods described above.

In FIG. 3, the data processing apparatus 300 incorporates any combination of additional devices. These include, but are not limited to, a mass storage device 315, one or more peripheral devices 320, an audio means 325, one or more input devices 330, one or more portable storage medium drives 335, a graphics subsystem 340, a display 345, and one or more output devices 350. The various components are connected via an appropriate bus 355 as known by those skilled in the art. In alternative embodiments, the components are connected through other communications media known in the art. In one example, processor 305 and memory 310 are connected via a local microprocessor bus; while mass storage device 315, peripheral devices 320, portable storage medium drives 335, and graphics subsystem 340 are connected via one or more input/output ("I/O") buses.

In FIG. 3, mass storage device 315 is implemented as fixed and/or removable media, for example, as a magnetic, optical, or magneto-optical disk drive. The drive is preferably a non-volatile storage device for storing data and instructions for use by processor 305. In some embodiments, mass storage device 315 stores client and server information, code for carrying out methods in accordance with exemplary embodiments of the invention, and computer instructions for processor 305. In other embodiments, computer instructions for performing methods in accordance with exemplary embodiments of the invention also are stored in processor 305. The computer instructions are programmed in a suitable language such as Java or C++.

In FIG. 3, the portable storage medium drive 335, in some embodiments, operates in conjunction with a portable non-volatile storage medium, such as a floppy disk, CD-ROM, or other computer-readable medium, to input and output data and code to and from the data processing apparatus 300. In some embodiments, methods performed in accordance with exemplary embodiments of the invention are implemented using computer instructions that are stored on such a portable medium and input to the data processing apparatus 300 via portable storage medium drive 335.

In FIG. 3, the peripheral devices 320 include any type of computer support device, such as an I/O interface, to add functionality to data processing apparatus 300. In one example, the peripheral devices include a network interface card for interfacing the data processing apparatus 300 to a network, a modem, and the like. The peripheral devices also include input devices to provide a portion of a user interface and may include an alphanumeric keypad or a pointing device such as a mouse, a trackball, a stylus, or cursor direction keys. The I/O interface comprises conventional circuitry for controlling input devices and performing particular signal conversions upon I/O data. The I/O interface may include, for example, a keyboard controller, a serial port controller, and/or digital signal processing circuitry.

In FIG. 3, the graphics subsystem 340 and the display 345 provide output alternatives of the system. The graphics subsystem 340 and display 345 include conventional circuitry for operating upon and outputting data to be displayed, where such circuitry preferably includes a graphics processor, a frame buffer, and display driving circuitry. The display 345 may include a cathode ray tube (CRT) display, a liquid crystal display (LCD), or other suitable devices. The display 345 preferably can display at least 256 colors. The graphics subsystem 340 receives textual and graphical information and processes the information for output to the display 345. A video card in the data processing apparatus 300 also comprises a part of graphics subsystem 340 and also preferably supports at least 256 colors. For optimal results in viewing digital images, the user should use a video card and monitor that can display the True Color (24 bit color) setting. This setting enables the user to view digital images with photographic image quality.

In FIG. 3, audio means 325 preferably includes a sound card, on-board sound processing hardware, or a device with built-in processing devices that attach via Universal Serial Bus (USB) or IEEE 1394 (Firewire). The audio means 325 receives audio signals from a peripheral microphone. In addition, audio means 325 may include a processor for processing sound. The signals can be processed by the processor in audio means 325 of data processing apparatus 300 and passed to other devices as, for example, streaming audio signals.

In some embodiments, programs for performing methods in accordance with exemplary embodiments of the invention are embodied as computer program products. These generally comprise a non-transitory storage medium or non-transitory memory media having instructions stored thereon used to program a computer to perform the methods described above.

Examples of suitable storage medium or media include any type of disk including floppy disks, optical disks, DVDs, CD ROMs, magnetic optical disks, RAMs, EPROMs, EEPROMs, magnetic or optical cards, hard disk, flash card, smart card, and other media.

Stored on one or more of the computer readable media, the program includes software for controlling both the hardware of a general purpose or specialized computer or microprocessor. This software also enables the computer or microprocessor to interact with a human or other mechanism -utilizing the results of exemplary embodiments of the invention. Such software includes, but is not limited to, device drivers, operating systems and user applications. Preferably, such computer readable media further include software for performing the methods described above.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

The invention claimed is:

1. A method comprising:
    storing a plurality of reference documents within a repository of reference documents on a storage device, including storing reference data for each reference document of the plurality of reference documents, wherein the reference data comprises data representing human-readable content from an associated reference document of the plurality of reference documents, wherein the human-readable content includes actual content from the associated reference document of the plurality of reference documents;
    receiving digital data at a data processing system from a handheld device, wherein the digital data corresponds to one or more of the reference document of the plurality of reference documents, and wherein the digital data comprises at least human-readable content captured by scanning a document by the handheld device, wherein the human-readable content is actual content of the document;
    extracting at least a portion of the received digital data including human-readable content that is actual content from the document scanned by the handheld device in the form of text data as scanning data;
    retrieving from the storage device reference data for at least one reference document of the plurality of reference documents;
    comparing the scanning data with the retrieved reference data, wherein the comparison of the scanning data with the retrieved reference data includes a comparison of the human-readable content in the scanning data that is actual text content of the document with the human-readable content that is actual text content of the at least one reference document in the retrieved reference data; and
    if comparing the scanning data with the retrieved reference data indicates at least the portion of the scanning data that is the actual text content of the document matches at least a portion of the retrieved reference data that is the actual text content of the at least one reference document in the retrieved reference data, identifying the at least one reference document of the plurality of reference documents associated with the matched at least a portion of the retrieved reference data as being the document scanned by the handheld device.

2. The method of claim 1, wherein human-readable content comprises any one of: text data and/or graphical data.

3. The method of claim 1, wherein at least one of the steps of receiving, retrieving, comparing and identifying are performed by a data processing system of a server connected to the handheld device by a wireless network connection.

4. The method of claim 1 comprising sending at least a portion of the identified one or more reference documents to the handheld device.

5. The method of claim 4, wherein the sending comprises:
    attaching the identified one or more reference documents to an e-mail message, and
    sending the e-mail message to a data processing system.

6. The method of claim 4, wherein the step of sending data includes sending the identified one or more reference documents to a receiving address.

7. The method of claim 4, further comprising:
    identifying, when the scanning data matches at least a portion of the reference data associated with a second reference document of the plurality of reference documents, the second reference document as an alternative identified document; and
    sending at least a portion of the alternative identified document to the handheld device.

8. The method of claim 7, further comprising:
    receiving an indication from the handheld device indicating the data representing one or more portions of the identified one or more reference documents or the at least a portion of the second reference document as identifying the one or more reference documents.

9. The method of claim 4, wherein the sending includes sending an image of at least a portion of the identified one or more reference documents.

10. The method of claim 1, wherein the method is performed by a computer processing system.

11. The handheld device of claim 1, wherein the handheld device comprises an electronic tablet.

12. The handheld device of claim 1, wherein the handheld device comprises a mobile phone.

13. The method of claim 1, wherein the human-readable content represents a spoken voice.

14. The method according to claim 1, wherein a storage device is a remote storage device.

15. The method according to claim 1, wherein the at least one information comprises at least one of the author, title and reference number of the associated reference document of the plurality of reference documents.

16. A data processing system for identifying one of a plurality of reference documents from information received from a handheld device in communication with the data processing system, the data processing system coupled to the data network and each reference document having reference data, the data processing system comprising:
    at least one memory device in which a plurality of instructions are stored; and
    a processor coupled to the at least one memory device and capable of executing instructions in the memory device to: (i) access the reference data in the at least one memory device, and (ii) receive the information from the handheld device, wherein the information comprises data scanned from a document by the handheld device, wherein execution of the instructions causing a plurality of steps to be performed including:
        storing a plurality of reference documents within a repository of reference documents on a storage device, including storing reference data for each reference document of the plurality of reference documents, wherein the reference data comprises data representing human-readable content from an associated reference document of the plurality of reference documents, wherein the human-readable content includes actual content from the associated reference document of the plurality of reference documents;

receiving digital data at a data processing system from a handheld device, wherein the digital data corresponds to one or more of the reference documents of the plurality of reference documents, and wherein the digital data comprises at least human-readable content captured by scanning a document by the handheld device, wherein the human-readable content is actual content of the document;

extracting at least a portion of the received digital data including human-readable content that is actual content from the document scanned by the handheld device in the form of text data, as scanning data;

retrieving from the storage device reference data for at least one reference document of the plurality of reference documents;

comparing the scanning data with the retrieved reference data, wherein the comparison of the scanning data with the retrieved reference data includes a comparison of the human-readable content that is actual content of the document in the scanning data with the human-readable content that is actual content of the at least one reference document in the retrieved reference data; and if comparing the scanning data with the retrieved reference data indicates at least the portion of the scanning data that is the actual text content of the document matches at least a portion of the retrieved reference data that is the actual text content of the at least one reference document in the retrieved reference data, identifying the at least one reference document of the plurality of reference documents associated with the matched at least a portion of the retrieved reference data as being the document scanned by the handheld device.

17. The data processing system of claim 16, wherein the execution of the instructions by the processor causes further steps to be performed, namely:
receiving address information identifying a receiving address for a recipient;
establishing a communications path between the data processing system and a device associated with the recipient via the data network, and
sending, using the address information, at least a portion of the one or more reference documents to the receiving address of the recipient via the communications path.

18. The data processing system of claim 16, wherein sending at least a portion of the identified document includes:
sending at least a portion of one or more reference documents to a receiving address of the recipient via transmission over a data network coupling the handheld device to the data processing system.

19. The data processing system of claim 16, wherein sending data representing at least a portion of the identified document includes:
sending at least a portion of the identified document to a receiving address via facsimile transmission.

20. The data processing system of claim 16, further comprising sending data representing at least a portion of the identified one or more reference documents.

21. The data processing system of claim 16, wherein a storage device is a remote storage device.

22. The data processing system of claim 16, wherein the at least one information comprises at least one of the author, title and reference number of the associated reference document of the plurality of reference documents.

23. A wireless handheld device operable to establish a wireless data communications path with a data processing system coupled to a wireless data network, comprising:
(i) an information capturing apparatus operable to receive as input an information;
(ii) a transceiver operating to receive and transmit a wireless data connection with the data processing system coupled to the wireless data network, the transceiver being operable to:
establish a wireless communications path between the handheld device and the data processing system coupled to the wireless data network; and
send a captured digital data from the handheld device to the data processing system via the wireless communications path;
(iii) a memory in which a plurality of instructions are stored; and
(iv) a processor coupled to the memory and capable of executing the instructions in the memory, wherein execution of the instructions causes a plurality of steps to be performed including:
capturing the input information as the captured digital data utilizing the handheld device, wherein the digital data represents at least one human-readable content captured by the information capturing apparatus;
storing the captured digital data in the memory as scanning data, wherein the human-readable content includes content from the body of the associated reference document of the plurality of reference documents and identifying indicia comprising at least one information of the associated reference document of the plurality of reference documents; and
receiving, at the transceiver from the data processing system via the wireless communications path, data representing a comparing operation and an identifying operation performed at a remote location;
the comparing operation comprising: comparing the scanning data with a digital data representative of human-readable reference data for at least one reference document of a plurality of reference documents; and
the identifying operation comprising: if comparing the scanning data with the digital data representative of human-readable reference data indicates at least a portion of the scanning data that is actual text content of the document matches at least a portion of the digital data that is actual text content of the at least one reference document, identifying the one or more reference documents of the plurality of reference documents as being the document containing the human-readable content captured by the information capturing apparatus.

24. The handheld device of claim 23, wherein the information is captured from an electronic document.

25. The handheld device of claim 23, wherein capturing digital data includes:
scanning the document to generate scanned information, and converting the scanned information to the digital image data.

26. The handheld device of claim 23, wherein the handheld device is a cellular phone.

27. The handheld device of claim 23, wherein the handheld device is a personal digital assistant ("PDA").

28. The handheld device of claim 23, wherein the handheld device effects communications over the wireless data communications path with other network devices.

29. The handheld device of claim 23, wherein the handheld device captures the digital image data using an image capture capability of the handheld device.

30. The handheld device of claim 23, wherein the handheld device is an electronic tablet.

31. The handheld device of claim 23, wherein the handheld device is a mobile phone.

32. The handheld device of claim 23, wherein the input information comprises human-readable content.

33. The handheld device of claim 32, wherein at least a portion of the human-readable content comprises an image information.

34. The handheld device of claim 32, wherein at least a portion of the human-readable content comprises a text information.

35. The handheld device of claim 32, wherein at least a portion of the human-readable content comprises a spoken information.

36. The handheld device of claim 23, wherein a storage device is a remote storage device.

37. The handheld device of claim 23, wherein the at least one information comprises at least one of the author, title and reference number of the associated reference document of the plurality of reference documents.

38. A non-transitory computer readable media containing processor readable program code that when executed by a processor in a data processing system, causes the data processing system to perform a method for identifying one or more of a plurality of reference documents, each reference document having reference data stored in a memory and wherein the reference data comprises data from the associated reference document, based on digital image data received by the data processing system from a handheld device in wireless communication with the data processing system over a data network, the method comprising:
receiving digital image data at a data processing system from a handheld device, wherein the digital image data corresponds to an image of one of the reference documents of the plurality of reference documents, and wherein the digital image data comprises at least one image of a document captured by the handheld device, wherein the digital image data corresponds to human-readable content within the document and does not comprise information exclusively machine readable;
extracting at least a portion of the received digital data including human-readable content that is actual content from the document scanned by the handheld device in the form of text data as scanning data;
retrieving from the memory device the reference data for at least one reference document;
comparing the scanning data with the retrieved reference data, wherein the comparison of the scanning data with the retrieved reference data includes a comparison of the human-readable content that is actual text content of the at least one reference document in the reference data with the human-readable content of the scanning data that is actual text content of the document;
if comparing the scanning data with the retrieved reference data indicates at least the portion of the scanning data that is the actual text content of the document matches at least a portion of the retrieved reference data that is the actual text content of the at least one reference document in the retrieved reference data, identifying the one reference document as the document scanned by the handheld device; and
sending data representing at least a portion of the identified document to the handheld device.

39. The non-transitory computer readable media of claim 38, wherein a storage device is a remote storage device.

40. The non-transitory computer readable media of claim 38, wherein the at least one information comprises at least one of the author, title and reference number of the associated reference document of the plurality of reference documents.

41. A computer program product, comprising:
a non-transitory computer readable media; and
program code on the computer readable media that when executed by a data processing system, cause the data processing system to perform:
storing a plurality of reference documents within a repository of reference documents on a storage device, including storing reference data for each reference document of the plurality of reference documents, wherein the reference data comprises data representing human-readable content from an associated reference document of the plurality of reference documents, wherein the human-readable content includes actual content from the associated reference document of the plurality of reference documents;
receiving digital data at a data processing system from a handheld device, wherein the digital data corresponds to one or more of the reference documents of the plurality of reference documents, and wherein the digital data comprises at least human-readable content captured by scanning a document by the handheld device, wherein the human-readable content is actual content of the document;
extracting at least a portion of the received digital data including human-readable content that is actual content from the document scanned by the handheld device in the form of the text data as scanning data;
retrieving from the storage device reference data for at least one reference document of the plurality of reference documents;
comparing the scanning data with the retrieved reference data, wherein the comparison of the scanning data with the retrieved reference data includes a comparison of the human-readable content that is actual content of the document in the scanning data with the human-readable content that is actual content of the at least one reference document in the retrieved reference data; and
if comparing the scanning data with the retrieved reference data indicates at least the portion of the scanning data that is the actual text content of the document matches at least a portion of the retrieved reference data that is the actual text content of the at least one reference document in the retrieved reference data, identifying the at least one reference document of the plurality of reference documents associated with the matched at least a portion of the retrieved reference data as being the document scanned by the handheld device.

42. The computer program product of claim 41, wherein a storage device is a remote storage device.

43. The computer program product of claim 41, wherein the at least one information comprises at least one of the author, title and reference number of the associated reference document of the plurality of reference documents.

44. A computer program product operable to execute on the processor of a wireless handheld device, the device being operable to establish a wireless data communications path with a data processing system coupled to a wireless data network, the wireless handheld device comprising:
- (i) an information capturing apparatus operable to receive as input an information;
- (ii) a transceiver operating to receive and transmit a wireless data connection with the data processing system coupled to the wireless data network, the transceiver being operable to:
    establish a wireless communications path between the handheld device and the data processing system coupled to the wireless data network; and
    send a captured digital data from the handheld device to the data processing system via the wireless communications path;
- (iii) a non-transitory computer readable media in which a plurality of instructions are stored; and
- (iv) the processor being coupled to the memory;
the computer program product comprising program code on the computer readable memory medium that when executed by the processor, cause the processor to perform:
    capturing the input information as the captured digital data utilizing the handheld device, wherein the digital data represents at least one human-readable content captured by the information capturing apparatus;
    storing the captured digital data in the memory as scanning data, wherein the human-readable content includes content from the body of the associated reference document of the plurality of reference documents and identifying indicia comprising at least one information of the associated reference document of the plurality of reference documents; and
    receiving, at the handheld device from the data processing system via the wireless communications path, data representing a comparing operation and an identifying operation performed at a remote location;
    the comparing operation comprising: comparing the scanning data with a digital data representative of human-readable reference data, wherein the comparison of the scanning data with the retrieved reference data includes a comparison of the human-readable content in the reference data with the human-readable content of the scanning data for at least one reference document of a plurality of reference documents; and
    the identifying operation comprising: identifying, when the comparing the scanning data with the digital data representative of human-readable reference data indicates at least a portion of the scanning data matches at least a portion of the digital data representative of human-readable reference data, the one or more reference documents of the plurality of reference documents associated with the matched at least a portion of the retrieved reference data as the document containing the human-readable content captured by the handheld device.

45. The computer program product of claim 44, wherein the handheld device is an electronic tablet.

46. The computer program product of claim 44, wherein the handheld device is a mobile phone.

47. The computer program product of claim 44, wherein the input information comprises human-readable content.

48. The computer program product of claim 47, wherein at least a portion of the human-readable content comprises an image information.

49. The computer program product of claim 47, wherein at least a portion of the human-readable content comprises a text information.

50. The computer program product of claim 47, wherein at least a portion of the human-readable content comprises a spoken information.

51. The computer program product of claim 44, wherein a storage device is a remote storage device.

52. The computer program product of claim 44, wherein the at least one information comprises at least one of the author, title and reference number of the associated reference document of the plurality of reference documents.

* * * * *